Dec. 2, 1941.    G. A. LYON    2,264,946
WHEEL STRUCTURE
Filed Feb. 5, 1940
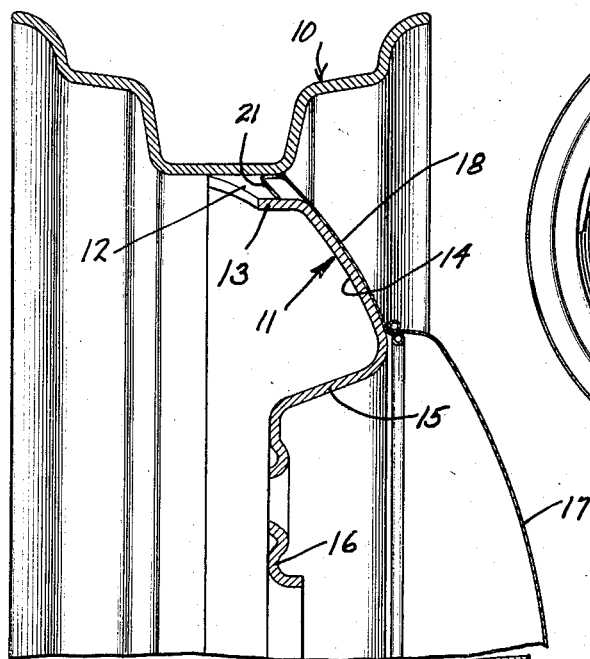
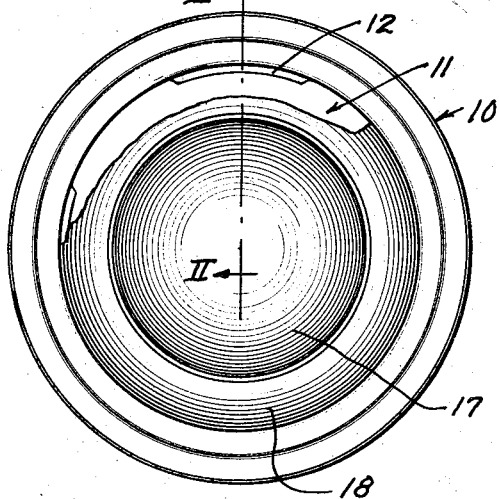
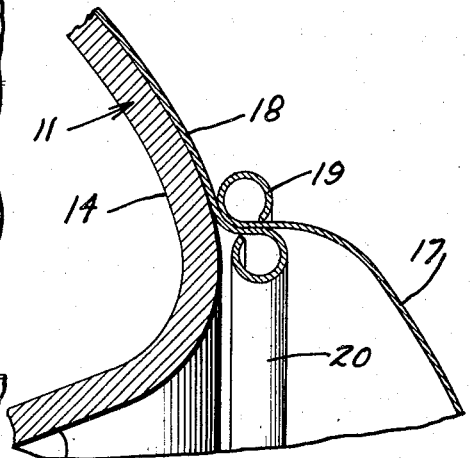
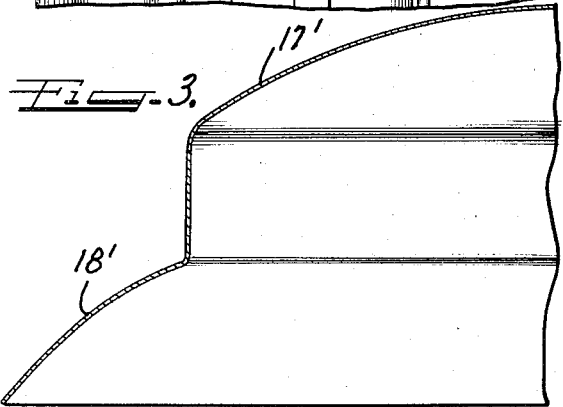
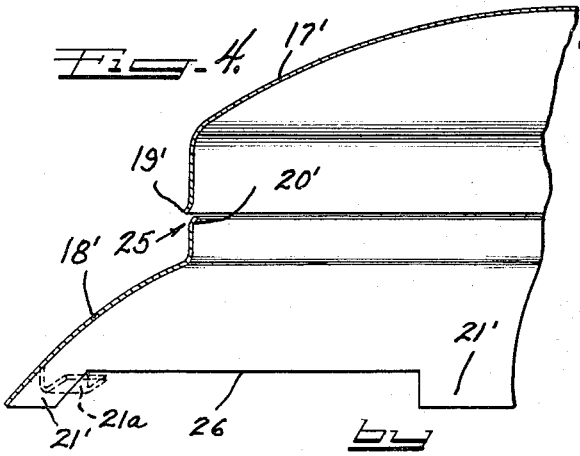
Inventor
GEORGE ALBERT LYON.

Patented Dec. 2, 1941

2,264,946

UNITED STATES PATENT OFFICE 2,264,946

WHEEL STRUCTURE

George Albert Lyon, Allenhurst, N. J.

Application February 5, 1940, Serial No. 317,240

3 Claims. (Cl. 301—37)

This invention relates to a wheel structure, as well as a method of making multiple nested members particularly adapted to serve as ornamental members for wheels.

An object of this invention is to provide an improved and simplified ornamental covering assembly for the outer side of a wheel and which assembly includes a multiple of parts so formed as to be readily interfitted with each other, as well as to be retained on the wheel.

Another object of this invention is to provide a novel method of making multiple nested members wherein the members may be economically manufactured from a common blank and wherein the act of severing the members from each other lends itself to the formation of the severed portions into turned edges adapted to telescopically cooperate with each other in the final assembly.

In accordance with the general features of this invention, there is provided a wheel construction including a wheel having the usual tire, rim, and body parts and a plurality of nested and interengaged ornamental members embodying the present invention and formed for disposition on an outer side of the wheel, these members comprising a dished central cap member having a radially outwardly turned edge and an outer ring-like cover member having a radially inwardly turned edge of such diameter as to nest inside of the cap member whereby the outer portion of the cap member may be pressed into resilient retaining cooperation with the radially inwardly turned edge of the ring member.

Another feature of the invention relates to the provision in one of the two ornamental members going to make up my novel cover assembly with retaining means for gripping a part of the wheel and which means by reason of the interconnection of the two cover members serves to secure both cover members to the wheel.

In accordance with other features of my invention, there is provided a novel method of making multiple nested members which comprises blanking a dished shell from a flat sheet, and which shell includes a central crowned portion and an outer marginal portion, severing the portions at their junction from each other, and turning the severed edges of said portions in opposite directions to form turned edges of such diameter that one can telescope the other to establish an interfitted engagement of said portions.

A further feature of my novel method or process relates to the utilization of the step of severing the portions as a means for also starting the turning of the edges which are to be formed into rolled edges, one edge being turned in one direction and the other edge being turned in the opposite direction.

Other objects and features of this invention will more fully appear from the following detailed description taken in connection with the accompanying drawing which illustrates a single embodiment thereof, and in which:

Figure 1 is a front view of a wheel structure embodying the features of this invention and wherein a portion of the cover assembly is broken away to show the openings in the body of the wheel;

Figure 2 is an enlarged fragmentary cross sectional view taken on the line II—II of Figure 1 looking in the direction indicated by the arrow;

Figure 3 is an enlarged fragmentary cross sectional view taken through the cover assembly in its process of manufacture and showing the initial step in the blanking of the two cover members that go to make up the assembly;

Figure 4 is a fragmentary cross sectional view similar to Figure 3 and showing the manner in which the members are severed at their junction with each other, as well as showing the manner in which the severed edges are initially slightly turned during the cutting or severing operation; and Figure 5 is an enlarged fragmentary cross sectional view through a portion of the wheel structure corresponding to a central part of the structure illustrated in Figure 2 and showing the manner in which the turned edges on the two cover members are rolled into oppositely facing rolled edges nested one within the other.

As shown on the drawing:

The reference character 10 designates generally a drop center type of tire rim which comprises one part of a wheel, and which is well known in the present automobile industry. Secured in any suitable manner to this tire rim part is a central body part 11, which is sometimes referred to as a "spider part" or a "spoke simulating part." Both the parts 10 and 11 are made of metal, as is well known, and may be fabricated on any suitable machinery.

The body part 11 has its outer peripheral portion provided with a plurality of transversely extending openings 12 defined on one side by the base flange of the tire rim part and on the other side by an inwardly turned portion 13 formed integral with the body part. These openings, as is well known, may serve as ventilation openings for providing for the circulation of air in and about the brake drum (not shown) which, as is well known, constitutes a part of the present commercial form of automobile wheels.

The central body part 11 includes a bulged nose portion 14 which terminates radially inwardly in an inclined generally axially extending portion 15 which at its inner side is connected to the usual wheel fastening flange 16 by means of which the wheel is attached by bolts or cap screws to a member on the axle of the wheel or other suitable support.

As stated before, the object of my invention is to provide a simplified cover assembly for concealing and ornamenting the outer side surface of the wheel. In accordance with the features of this invention, there is provided two cover parts or members which go to make up this assembly, namely, a central cap member 17 and an outer ring member or annulus 18. Both of these members are preferably made from sheet material, such, for example, as metallic sheet, and are of a convex-concave cross sectional shape. Reference to Figure 2 shows that these members are generally bulged or curved outwardly so as to provide the wheel with a continuous curved outer appearance.

The cap member 17 is centrally bulged but has its outer peripheral margin extending generally axially and formed into a rolled edge 19 which faces radially outwardly.

The ring member 18 has its inner peripheral portion formed into an axially outwardly extending rolled edge 20 which is disposed on the interior of the cap member 17 and telescopes the rolled edge portion 19 of the cap member 17.

The coaction of these two rolled edges 19 and 20 is such that the cap member 17 may be snapped into resilient retained cooperation with the edge 20. This is accomplished by making the turned edge 19 of a diameter on its innermost side slightly less than the outermost diameter of the rolled edge 20, so that the edge 19 must be resiliently wedged or forced over the edge 20. When thus assembled, the edges 19 and 20 are so interfitted or interlocked that the cap 17 is detachably secured to the ring member 18.

In order to secure this assembly of the two members to the wheel, the member 18 is provided at its outer peripheral portion with a plurality of underturned retaining fingers 21, one of which is shown in Figure 2. These fingers 21 correspond in number to the number of openings 12 about the peripheral portion of the wheel body member 11. It will also be noted from Figure 2 that each of the fingers 21 is not only turned back under the ring member 18 proper but in addition thereto is inclined radially inward and axially outward so as to have a gripping engagement with the outer surface of the portion 13 of the body member disposed on the bottom side of the opening 12. By reason of this angular relation of the finger 21 to the portion 13 it follows that any tendency to dislodge the member 18 from the wheel only results in an enhancement of the gripping engagement of the finger with the flange portion 13. In other words, any tendency to accidentally dislodge the member 18 from the wheel only results in an enhancement of the gripping engagement.

In practice, the member 18 may be first applied to the wheel and the cap 17 may thereafter be pressed axially into telescoping co-operation with the bead or rolled edge 20, so so that the two edges 19 and 20 are interlocked together. When it is desired to have access to the wheel bolts securing the flange 16 to the wheel the central cap may be pried loose thus exposing the central portion 16 of the wheel body.

Thereafter the cap 17 may be readily applied to the member 18 by pressing the rolled edge 19 over the high point of the rolled edge 20, so that the rolled edge 19 has a sprung fit on the rolled edge 20.

In the fabrication of these members, I have ascertained that they may be both made from a common sheet of material with a minimum amount of waste. In Figures 3 and 4, I have illustrated two of the steps in the fabrication of these members. Initially, a sheet of metal is blanked into the dished form shown in Figure 3, which includes a central bulged or crowned portion 17' and a ring-like marginal portion 18'. These portions have substantially the same shape that they ultimately assume in the finished parts 17 and 18, with the exception of the rolled edges and the retaining fingers on the part 18.

Thereafter, as shown in Figure 4, the two portions 17' and 18' are severed from each other at 25 by a suitable cutting operation. In the act of cutting the portions 17' and 18' so as to separate them, I contemporaneously cause the severed edge 19' on the portion 17' to be turned slightly outwardly and the severed edge 20' on the portion 18' to be turned slightly inwardly.

Subsequent to this severing operation, the slightly turned edges 19' and 20' may be curled by suitable equipment, either by a press operation or by a spinning operation, into the rolled oppositely facing edges 19 and 20 shown in Figure 5.

In addition thereto, it is also necessary thereafter to form the outer marginal portion of the ring portion 18' with a plurality of fingers such as the fingers 21. This is accomplished by suitable press equipment which slots the marginal portion at 26 and thereafter turns the ensuing fingers 25 back upon the main body of the portion 18' at the desired angle relative thereto.

I have, by dotted lines in Figure 4, illustrated at 21ª one of the fingers as being formed and pressed rearwardly at the desired angle. The portions of the metal between the fingers must, of course, be removed so as to provide the structure with the ultimate shape shown in Figure 2.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a wheel construction, a wheel including tire rim and body parts and a plurality of nested and interengaged ornamental cover members for disposition on an outer side of the wheel and over said wheel body part, said members comprising a dished central cap member having a circular bead extending radially outwardly from the dished body of the cap member and an outer ring-like cover member having an inner turned edge of such diameter as to nest inside of said cap member, said bead of said cap member being pressed into a resilient retaining cooperation with said inner turned edge of the ring member.

2. In a wheel construction, a wheel including tire rim and body parts and a plurality of nested and interengaged ornamental cover members for disposition on an outer side of the wheel and over said wheel body part, said members comprising a dished central cap member having a circular bead extending radially outwardly from the dished body of the cap member and an outer ring-like cover member having an inner turned edge of such diameter as to nest inside of said cap member, said bead of said cap member being pressed into a resilient retaining cooperation with said inner turned edge of the ring member, one of said members being provided with wheel engaging and retaining means so as to grip one of said wheel parts and thus retain said one member, as well as the other member interfitted therewith, on said wheel.

3. In a wheel construction, a wheel including tire rim and body parts and a plurality of nested and interengaged ornamental cover members for disposition on an outer side of the wheel and over said wheel body part, said members comprising a dished central cap member having a circular bead extending radially outwardly from the dished body of the cap member and an outer ring-like cover member having an inner turned edge of such diameter as to nest inside of said cap member, said bead of said cap member being pressed into a resilient retaining cooperation with said inner turned edge of the ring member, one of said members being provided with wheel engaging and retaining means so as to grip one of said wheel parts and thus retain said one member, as well as the other member interfitted therewith, on said wheel, said retaining means being provided on said outer ring-like cover member for attaching said outer member to one of said wheel parts.

GEORGE ALBERT LYON.